April 21, 1959     O. K. KELLEY     2,882,684
HYDRAULIC TORQUE CONVERTER
Original Filed July 17, 1956     6 Sheets-Sheet 1

Fig. 1

INVENTOR.
Oliver K. Kelley
BY
T. L. Chisholm
ATTORNEY

April 21, 1959      O. K. KELLEY      2,882,684
HYDRAULIC TORQUE CONVERTER
Original Filed July 17, 1956      6 Sheets-Sheet 2

INVENTOR.
BY *Oliver K. Kelley*

*T. L. C. Chisholm*
ATTORNEY

April 21, 1959 — O. K. KELLEY — 2,882,684
HYDRAULIC TORQUE CONVERTER
Original Filed July 17, 1956 — 6 Sheets-Sheet 4

INVENTOR.
Oliver K. Kelley
BY
T. L. Chisholm
ATTORNEY

April 21, 1959     O. K. KELLEY     2,882,684
HYDRAULIC TORQUE CONVERTER
Original Filed July 17, 1956     6 Sheets-Sheet 5

Fig. 6

INVENTOR.
Oliver K. Kelley
BY
T. L. Chisholm
ATTORNEY

United States Patent Office
2,882,684
Patented Apr. 21, 1959

2,882,684

HYDRAULIC TORQUE CONVERTER

Oliver K. Kelley, Bloomfield Hills, Mich., assignor to General Motors Corporation, Detroit, Mich., a corporation of Delaware Application July 31, 1957, Serial No. 675,381

12 Claims. (Cl. 60—54)

This application is a division of my application Serial No. 598,370 filed July 17, 1956. The parent application discloses improvements in hydrodynamic torque transfer and/or multiplying devices and associated gearing for driving a power output member at various speed ratios from a power input member, particularly suited to motor vehicle transmissions.

This divisional application is directed to a bladed member of such torque transmitting device in which the blades are adjustable to vary the torque transmitted, and is directed to control apparatus for positioning the blades.

The objects of this invention include the provision of improved structure of adjustable blades and their supports, improved one-way rotatable supporting structure for a stator, guide wheel or reaction member using such adjustable blades, improved structure for moving and holding the adjustable blades and improved control systems and apparatus.

Other objects and advantages will appear in the following specification and in the accompanying drawings, in which.

*General arrangement*

Figure 1:
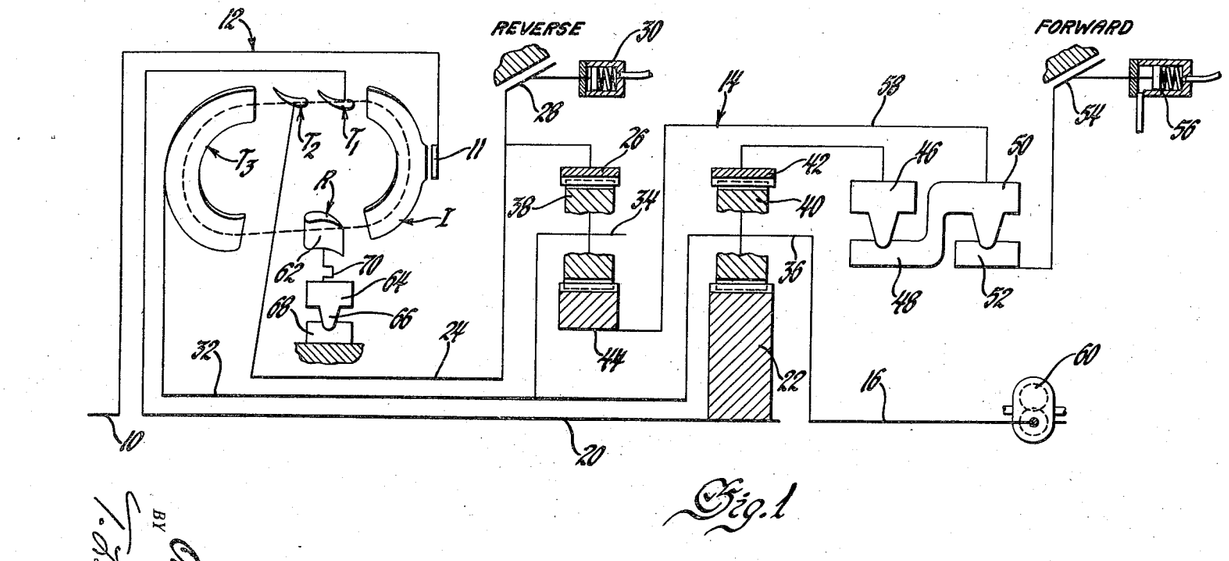
Figure 1 shows schematically a transmission embodying one form of my invention, being one-half of a longitudinal section which is symmetrical about the axis of rotation.

Referring to Fig. 1, the transmission includes in general an input or engine shaft 10 which can be connected by a neutral clutch 11 for driving a hydrodynamic torque transmitting device, exemplified as a torque converter 12 which in turn drives planetary reduction gearing 14 connected to a final drive shaft 16, which may drive the wheels of a vehicle.

The torque converter includes a pump or impeller I of generally known form, rotated by the input shaft 10 when connected by the neutral clutch 11 and circulating working liquid in a closed toroidal path which include three turbines, $T_1$, $T_2$ and $T_3$ and a reaction member R.

The first turbine $T_1$ is connected by shaft 20 to drive a rear input sun gear 22 of the planetary gearing. The second turbine $T_2$ is connected by a shaft 24 to drive a front input ring gear 26 which can also be held fast by a reverse ground clutch 28 whenever the clutch is set by any suitable hydraulic cylinder 30, and this effects reverse drive. The third turbine $T_3$ is connected by shaft 32 to drive front and rear carriers 34 and 36, which respectively support front planetary pinions 38 meshing with the front input ring gear 26, and rear planetary pinions 40 which mesh with the rear input sun gear 22. The shaft 32 forms the principal drive shaft of the transmission and through the carrier 36 is connected to the final drive shaft 16. A reaction ring gear 42, meshing with planet pinions 40 completes the rear planetary unit of the reduction gear, and a reaction sun gear 44, meshing with the front planet pinions 38, completes the front planetary unit.

The rear reaction ring gear 42 is connected to a one-way clutch or ratchet device having an outer race 46 which can rotate about the centerline of shaft 16 and toward the eye of the observer, with respect to an inner race 48, but is prevented from rotating in the opposite sense with respect to the race 48. The inner race 48 is integral with an outer race 50 of a second similar one-way clutch rotatable toward the eye of the observer about an inner race 52 but prevented from rotating in the opposite sense with respect to race 52. The race 52 can be held fast by a forward clutch 54 which can be set by a hydraulic cylinder 56. The races 48 and 50 are connected to the front sun reaction gear 44 by a drum 58.

The drive shaft 16 is constantly connected to drive a so-called rear pump 60 which when running forward above a predetermined speed can pump oil under pressure through any suitable control system.

The apparatus so far described is known, and constitutes one form of transmission for driving the output shaft forward at one range of infinitely varying speed ratios when the clutches 11 and 54 are set, and for driving the output shaft backward at another range of infinitely varying speed ratios when the clutches 11 and 28 are set.

The stator or reaction member includes blades 62 mounted on a suitable rotatable support 64, having any known one-way brake represented by ratchet members 66 cooperating with a stationary support 68 so as to permit forward rotation but prevent backward rotation, as is known. Under ordinary conditions of driving, the blades 62 of the stator or reaction member R are placed at a relatively low angle with respect to the direction of the oil striking them, as is known.

While the torque converter operating as described provides a satisfactory torque ratio at starting and at low speeds under light loads, it is an object of my invention to increase the range of torque ratios throughout an intermediate speed range in order to provide greater ability of the car to accelerate. It is also an object to prevent creep of the car from standstill when the engine is idling. When the car is standing, and in the intermediate speed ranges, which may be considered to be between 15 and 40 m.p.h., the blades 62 of the reaction member R may be placed at a somewhat higher angle, with respect to the axis of the converter, which angle may be regarded as of medium or intermediate magnitude. This, as is known, changes the direction of the oil through an angle of medium magnitude and increases the performance, or range of torque ratios effected by the torque converter, through a medium range when the engine is running at driving speed. When the engine is idling, this angle may decrease flow through the converter and thus prevent creep.

It is desirable to provide still higher range of torque multiplication for some conditions of drive, for example for hill climbing and passing other cars at relatively high speed. In order to provide this third or high performance range, the stator blades are placed at high angle, higher than the medium angle, and this further increases the performance, or ability of the car to accelerate, as is known.

In order to move the blades 62 and hold them at the desired angle each blade is mounted on a crank shaft 70 which is positioned preferably by the structure and control apparatus described below.

*Structural arrangement*

Figure 2:
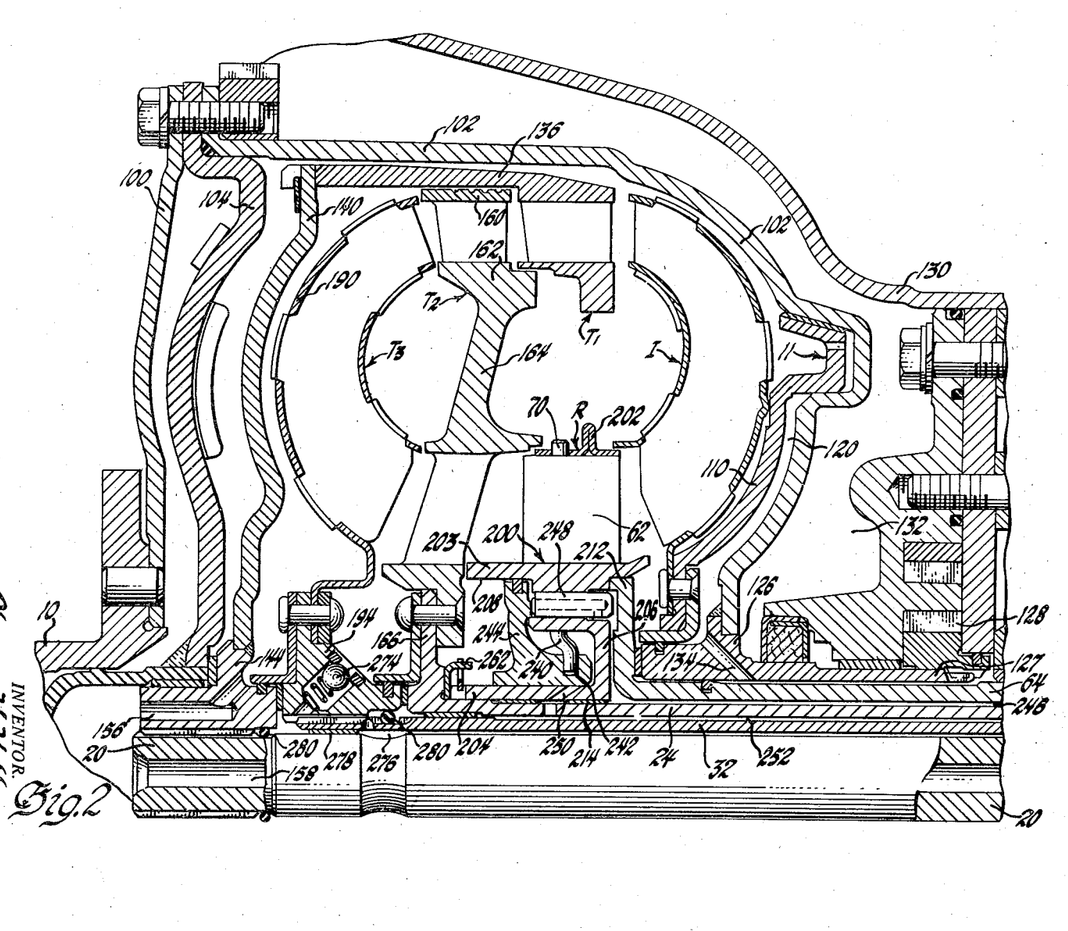
Figure 2 is one-half of a symmetrical longitudinal section of the actual structure of a torque converter in a transmission embodying one form of of my invention.

Fig. 2 illustrates one form of actual structure embodying the invention and including elements and their method of operation disclosed schematically above.

The blade arrangements of the various elements of the torque converter have previously been proposed by me. The particular structure of the mounting and devices for controlling the blades of the reaction member are new.

The engine shaft 10 is bolted to a flywheel 100 which is bolted to a torque converter casing including an outer shell 102 and a front cover 104. The impeller I is riveted to a quarter-toroidal shell 110 which is formed at its outer edge into one member of neutral clutch 11, the other member of which is formed in the shell 102. The space 120 between the torque converter shell 102 and the clutch shell 110 constitutes an expansible chamber motor, hydraulic cell, or servo by which the clutch may be held disengaged, the clutch being engaged by the customary pressure of oil in the converter when this servo 120 is vented, as will be explained.

The converter shell 102 is welded to a hub 126, secured to or forming part of a tubular shaft 127 which drives any suitable oil pump 128 (herein called the front pump) enclosed in part of the stationary casing 130. The hub 126 is drilled and is spaced from the stator supporting sleeve 64 to form a passage 134 by which oil may be supplied to the clutch release servo 120, as will be explained.

The first turbine $T_1$ includes an outer supporting shell 136 suitably keyed to a $T_1$ flange 140 welded at its center to hub 144 keyed to the innermost shaft 20 which drives the rear sun gear 22 shown in Fig. 1. The hub 144 has openings 156 for supplying the torque converter from a passage 158 in the shaft 20, to which the system supplies oil under pressure.

The second turbine $T_2$ includes an outer shell 160 and an inner shroud 162 which is fixed to or forms part of a spider 164 riveted to a flange 166 or hub secured to the front end of the shaft 24, the other end of which drives the ring gear 26 of Fig. 1.

The third turbine $T_3$ includes an outer shell 190 riveted to a hub or flange 194 keyed to the front end of the hollow main shaft 32, keyed at its rear end to the carriers 34 and 36 of both planetary gear units and to the transmission output shaft or car propeller shaft 16.

Figure 3:
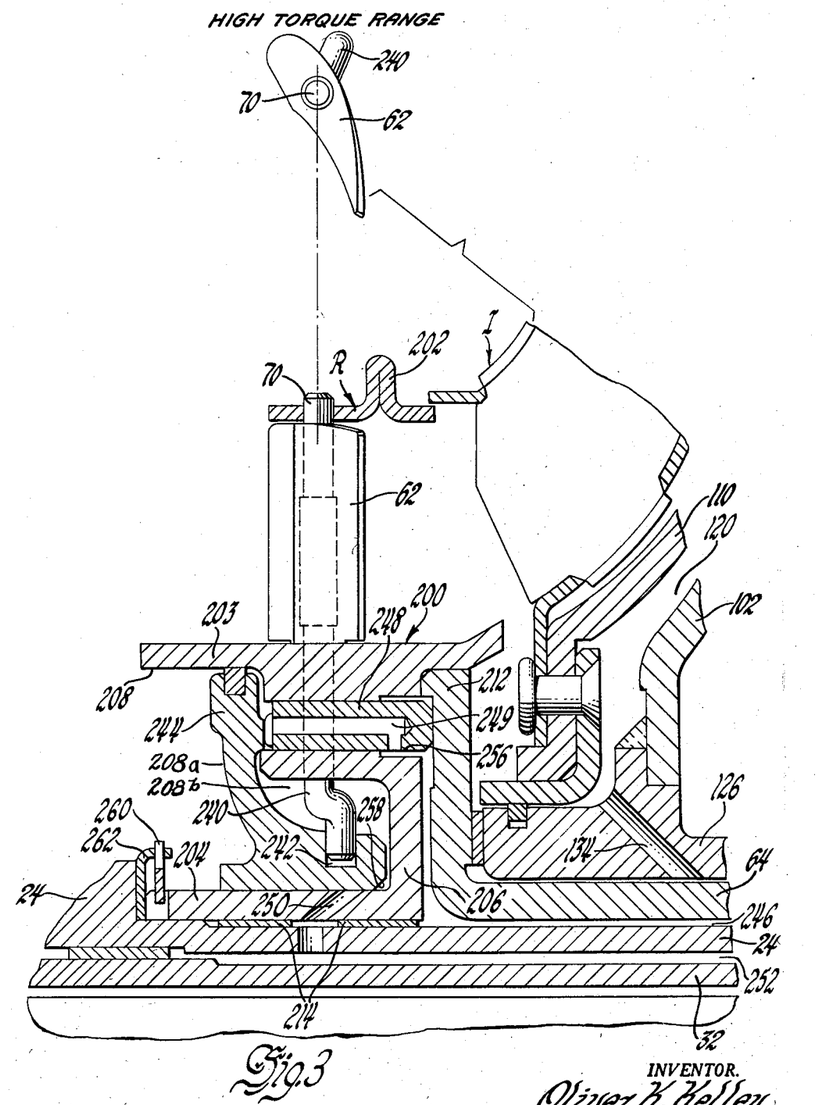
Figure 3 is an enlarged section taken as Fig. 2 is taken of stator control apparatus in the position of high torque converter performance, the corresponding high angle position of a blade being indicated schematically at the top of the figure.

Referring to Figs. 1 and 3, the reaction member, guide wheel or stator R which is placed between the outlet of turbine $T_3$ and the inlet of impeller I includes a blade support or stator body generally designated by 200 and an inner shroud 202 between which the blades 62 are mounted on the spindles 70. The body 200 has an outer cylindrical wall 203 joined to an inner cylindrical wall 204 by an annular or radial wall 206 to form an open ended annular cylinder 208. The radial wall 206 is secured to a flange 212 integral with or attached to the stator support sleeve 64 which in turn is supported for rotation by bearing sleeves 214. The sleeve 64 is keyed to any suitable free-wheeler, not shown, which permits the stator assembly as a whole to rotate in the sense of rotation of the turbines and prevent its rotation in the opposite sense as is known.

Figure 4:
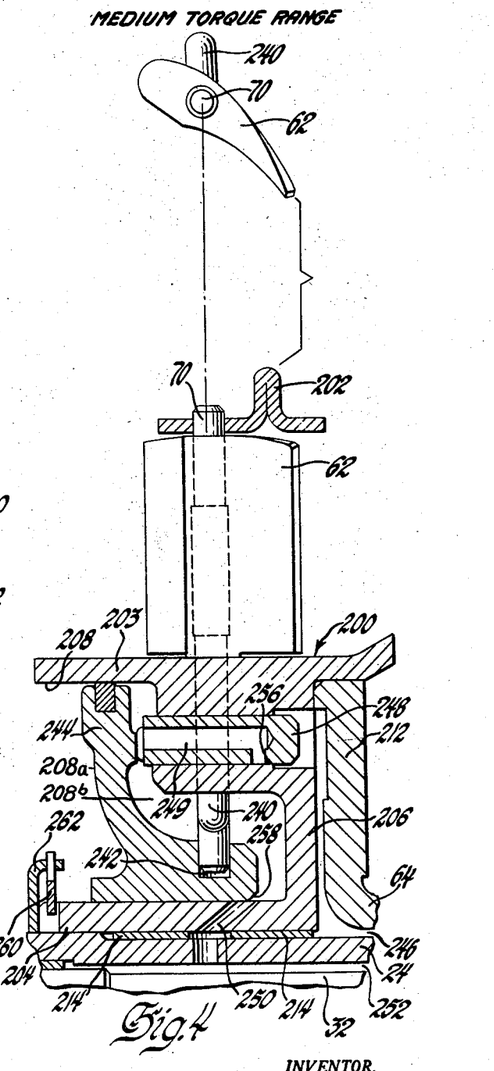
Fig. 4 is a section like Fig. 3 showing the stator control in mid-position to hold the stator blades at medium angle.
Figure 5:
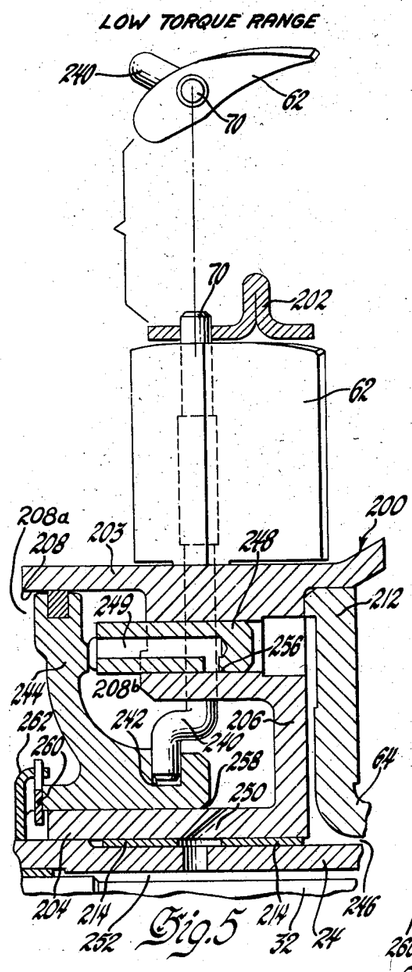
Fig. 5 is a section like Fig. 3 showing the stator control in low angle position.

As shown best in Figs. 3, 4 and 5, each crank shaft 70 has a crank arm 240 which is positioned in an annular groove 242 in an annular piston 244 which slides in the cylinder 208 and divides the cylinder into two fluid pressure chambers 208a and 208b. The position of the piston determines the angular position of the blades 62.

The cylinder 208 is open to the torque converter on the left of the piston as Fig. 2 is seen so that the customary pressure of the oil in the torque converter always urges the piston toward the right. When the piston is as far as it will go to the right, which position is shown in Fig. 3, the blades 62 are held at their highest angle or position of highest performance which is the position in which they redirect oil from the turbine $T_3$ to the impeller I through a relatively large angle. When the piston is in the position shown in Fig. 5 the blades are at their lowest angle, in which position they redirect oil through the lowest angle which gives the lowest range of torque multiplication in the converter.

2. As shown in Figs. 2 to 5, and as known in the art, the reaction blades 62 can have a greater area on the downstream side of the pivots 70 than on the upstream side. This causes the blades to be urged toward low angle, urging the piston 244 toward the position of Fig. 5, by the hydrodynamic force on the blades of oil flowing from the turbine to the impeller. If no pressure is maintained in the low angle holding chamber 208b converter pressure in the high angle holding chamber 208a overcomes this hydrodynamic force and holds the piston in the position of Fig. 3 and holds the blades at highest angle. Oil under pressure can be supplied to the low-angle holding chamber 208b on the right of piston 244 through a passage 246 under the control of a position-responsive valve or regulator valve 248, and oil can also be supplied to the same chamber through a mid-position control port 250 from a passage 252. Whenever oil is supplied through both passages at sufficient pressure, the piston is held in the position shown in Fig. 5 so that the blades are at lowest angle.

When oil is supplied to the low-angle holding chamber 208b through the passage 246 alone and passage 252 is vented the piston is held in the position of Fig. 4 holding the blades in a medium angle. This is accomplished as follows: When oil is first supplied to passage 246 at sufficient pressure, the piston 244 begins to move to the left. The sliding plug 248 follows the piston because the pressure on its right end is greater than the pressure on its left end. This is because pressure on its left end is that of oil flowing from its right end through a restricted passage 249 into an expanding space. When the piston reaches mid-position the corner or edge 256 of the position-responsive valve 248 cuts off communication between passages 246 and 249, stopping further admission of oil to low-angle holding chamber 208b. This holds the piston in the position shown in Fig. 4. The valve 248 thus acts as both a position-responsive cut-off valve and as a pressure regulator valve which together with piston 244 maintains in the chamber 208b a pressure just balancing the forces urging the piston toward the right. Thus if the pressure in the torque converter rises or that in the conduit 246 falls, the piston tends to move to the right but this opens the passage 249 to admit more liquid from the passage 246 which moves the piston to the left again until the passage 249 is closed. On the other hand if the torque converter pressure falls and piston moves too far to the left, the corner or edge 258 of the piston uncovers the port 250 so that liquid is drained from the chamber 208b allowing the converter pressure to move the piston back to the right. As soon as the port 250 is closed by the corner 258 of the piston, further drainage is prevented and the piston is held in the mid-position.

Passage 246 includes the annular space between stator shaft 64 and the $T_2$ shaft 24 and communicates with the control system as will be explained. The passage 252 includes the space between the $T_2$ shaft 24 and the $T_3$ shaft 32 and this passage is prevented from communicating with the passage 246 by the rearmost of the bearing sleeves 214 which effectively forms a seal between them. The passage 252 communicates with the control system as will be explained. The piston 244 is held in the cylinder 208 by a retainer or snap ring 260 which may have openings to receive tabs 262 of a radial thrust washer between the end of the inner wall 204 of the stator support and the hub 166 of the $T_2$ shaft 24. The front bearing sleeve 214 forms a seal, sufficiently preventing communication between passage 252 and the interior of the converter.

Oil is supplied under pressure to the conduit 158 shown in Fig. 2 and the converter is kept under pressure by the pumps including the front pump 128 forming part of the control system as is known. Oil may leave the working space of the torque converter by the pressure responsive relief valve 274 of any suitable form, located in $T_3$ hub 194 and allowing oil to pass from the torque converter space between the $T_2$ hub 166 and the $T_3$ hub 194 to the passage 276 formed by the annular space between the shaft 20 and the shaft 32 at a point behind bearing sleeve 278, this passage 276 being sealed from communication with other parts of the torque converter at its front end by the seals 280.

Control system

Figure 6:
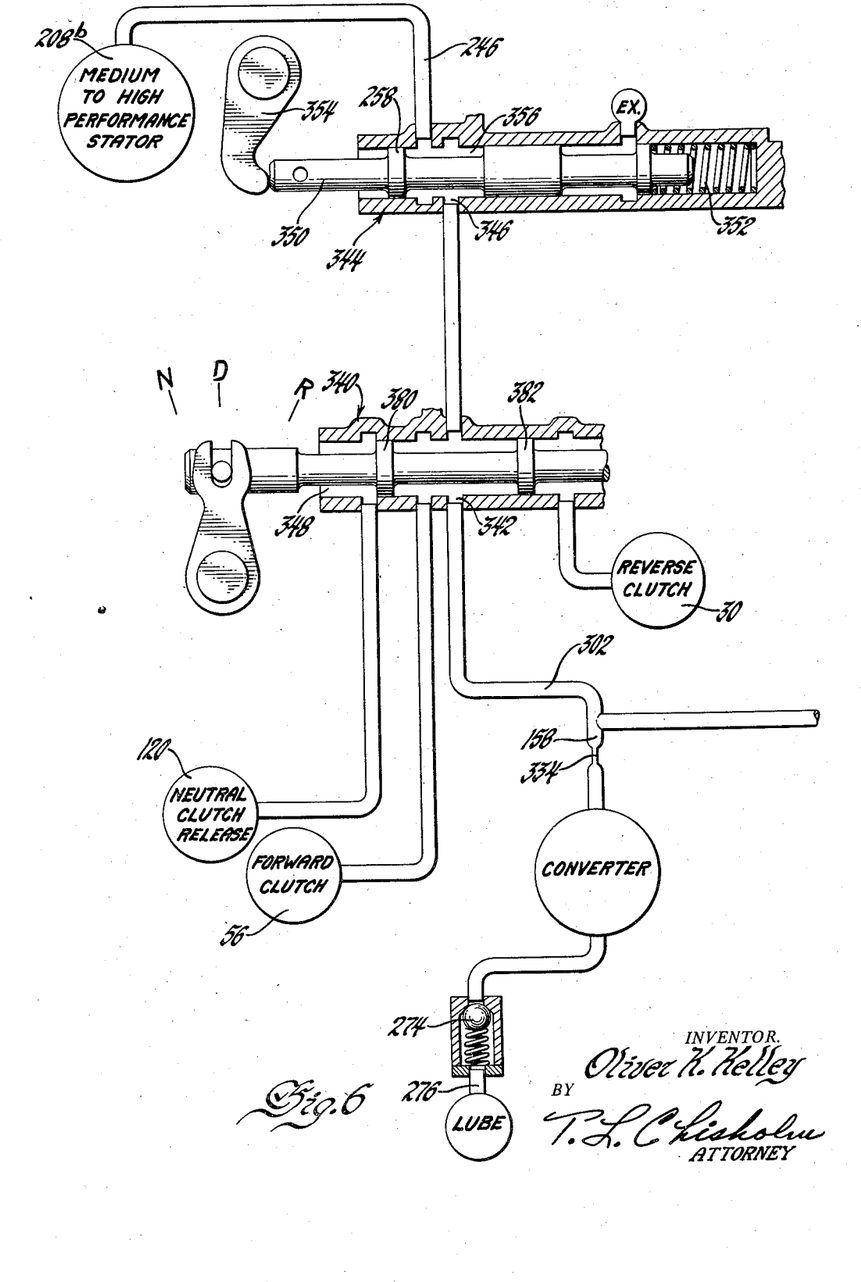
Figs. 6 and 6A together constitute a diagram of a hydraulic control system for a transmission shown in the preceding figures.
Figure 6A:
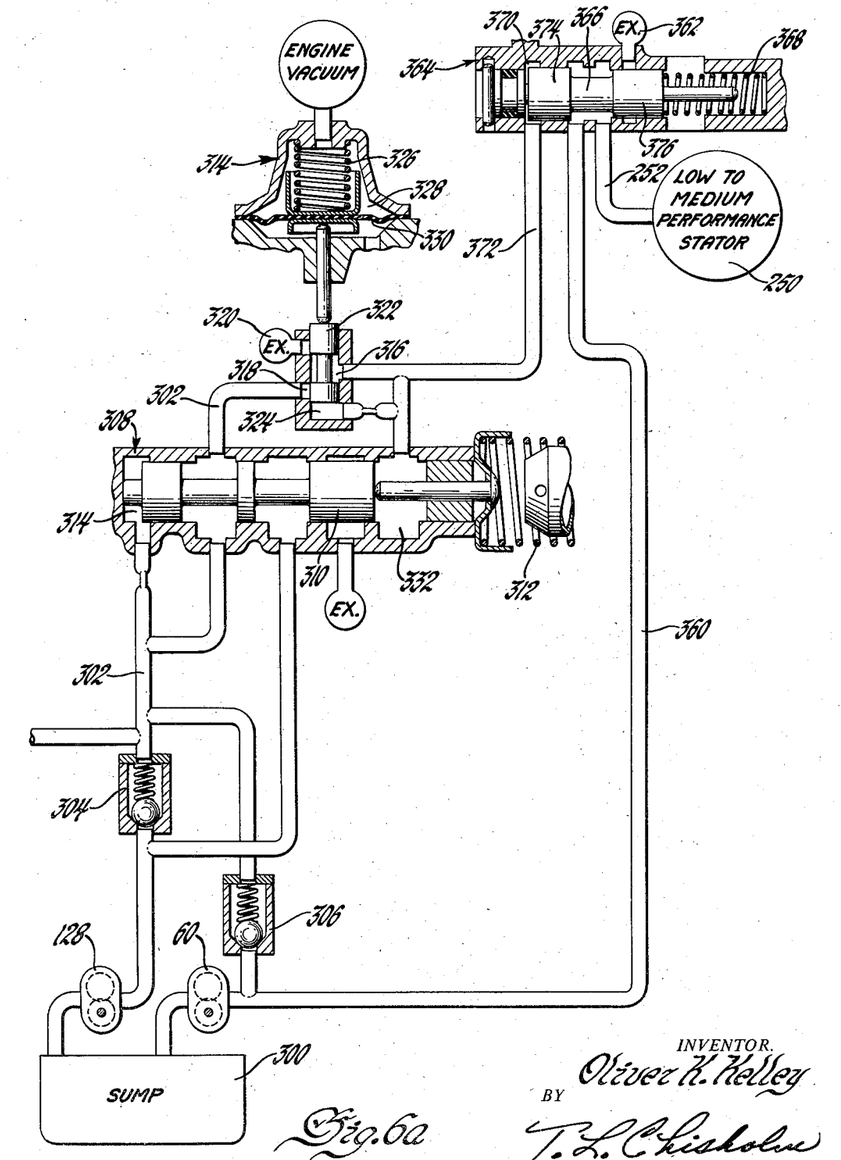

The structure described above can be operated by any suitable controls which select forward and reverse and which place the stator blades in the desired positions either manually or automatically, but preferably I use controls including improved and novel features as described and as shown diagrammatically in Figures 6 and 6A.

In general the objects of the invention as embodied in the control system include the provision of two sources of control pressure, one operative whenever the engine is running, and one operative whenever the car is running forward; a manually operable selector valve for forward, neutral and reverse, an automatic control for increasing the angle of the stator blades both in response to a predetermined torque demand on the engine (that is on the input member 10) and whenever the car stops; and a manually operated control for placing the stator in high angle in response to high torque demand on the engine but only after the throttle has been fully opened.

The source of pressure operative whenever the engine is running is the front pump 128 shown in Figs. 2 and 6A. This may be of any suitable known type and is designed to provide at its outlet a constant pressure, which pressure however may be adjusted or modulated with changes of torque demand on the engine by suitable controls to be described. The source of pressure operative when the car is running forward is the rear pump 60 as shown in Fig. 6A which may be similar in construction and operation to the front pump, but provides constant pressure above a certain car speed. However, the flow from the rear pump is divided into two paths. One of these is combined with the flow from the front pump, or is substituted for it, and so its pressure is regulated by torque demand. The other part of the flow controls the mid position of the stator and the pressure of this branch of the flow is not modulated.

Referring to Fig. 6A, both pumps take in oil from a common sump 300 and discharge to a main hydraulic control line 302 through check valves 304 and 306 so that when either pump is operating, the other pump can supply oil to the system and this supply will not be drained through the idle pump, likewise the rear pump alone will supply certain elements of the control system.

The pressure of the main line 302 is controlled by a pressure regulator valve 308 of any suitable known form which may include a valve stem 310 constantly urged to the left by a spring 312 against the force of pressure in a regulating chamber 314 which is connected to the main line 302. As is known this tends to maintain a constant pressure in the line 302, which pressure may nevertheless be reduced in response to low torque demand on the engine by any suitable known torque demand responsive regulator valve, for example the vacuum modulator valve generally denoted by 314. This includes a modulated pressure chamber 316 to which oil is admitted from main line 302 at inlet 318 and from which oil is vented to an exhaust port 320 under control of a valve stem 322 positioned in response to the balance of the force in one direction of pressure in regulating chamber 324 connected to the chamber 316 and the force in the opposite direction of a spring 326 as modified by the pressure in the intake manifold of the engine communicated to the space 328 surrounding the spring and enclosed by a flexible diaphragm 330 exposed to the atmosphere. The valve 314 is an example of a device which responds to torque demand on the input shaft 10 for controlling the position of the stator blades. The modulated pressure chamber 316 is connected to a pressure modulating chamber 332 in the regulator valve, where the pressure of chamber 316 assists spring 312. Whenever torque demand on the engine is low, the absolute pressure in the manifold is low (vacuum is high) and this reduces the force exerted by the spring 326 on valve 322, which reduces pressure in chambers 316 and 324 which reduces pressure in the main line 302. Thus main line pressure is maintained as a function of torque demand in the manner and for purposes which are known.

Oil is supplied to the converter from the main line 302 through conduit 158 previously referred to which includes the bore 158 of the hollow shaft 20 in Fig. 2. Oil flows to the converter through a restriction 334 and from the converter to lubricate the various parts of the apparatus through the conduit 276 under the control of the pressure responsive release valve 274. This arrangement maintains a static pressure in the torque converter which is below that of the main line and may be for example 30 pounds per square inch.

A manual selector valve 340 is supplied with oil from the main line 302 at its inlet port 342. The valve is shown in the forward drive position in which oil is supplied to the forward clutch cylinder 56. Oil is always supplied to a first stator control valve generally denoted by 344 through the line 346, whenever either pump 60 or 128 is pumping. At the same time, the neutral clutch release servo 120 is vented through the open end 348 of the manual valve. This permits the pressure of oil in the converter to apply the neutral clutch and the clutch 54 sustains the necessary torque reaction to drive the car forward.

The medium to high performance stator control valve 344 includes a valve stem 350 which may be urged to the right against a return spring 352 by an arm 354 connected to the throttle mechanism of the engine so that the position of the valve stem 350 to the right of its zero position indicates the amount of throttle opening. The valve includes a chamber 356 communicating with the inlet 346 and supplying oil from main line to the previously described passage 246, which in all positions of the throttle from idling to full throttle, prevents the stator from going to high angle. Whenever the throttle is moved past wide-open position, a land 258 is positioned between conduit 246 and conduit 346 so that conduit 246 and stator cylinder 208 are vented through the open left end of the stator control valve around stem 350. This can empty the low-angle holding chamber 208b and allows the pressure in the converter 12 to hold the stator blades 62 in highest angle, which is the position shown in Fig. 3.

The control for holding the stator blades in either low or mid-position is shown in the upper right corner of Fig. 6A. The mid-range stator control port 250 and conduit 252 previously described in connection with Fig. 3 are arranged to be connected either to the rear pump by conduit 360 or to an exhaust port 362 by a stator low to mid-range control valve generally designated by 364. This valve includes a valve stem 366 urged to the right as Fig. 6A is seen against the force of a return spring 368 by the pressure modulated by the engine manifold as an indicator of torque demand on the input shaft 10, and derived from chamber 316 of the vacuum modulator valve 314, which is connected to a stator control valve operating chamber or servo 370 by conduit 372.

Whenever the pressure in the engine manifold is low, indicating low torque demand, which may be for example, indicated by a gauge reading of less than 6 to 8 inches of mercury vacuum in the manifold, the spring 368 holds the valve stem 366 in the position shown in Fig. 6A so that oil at the pressure of the rear pump is supplied by conduit 360 to conduit 252 while exhaust port 362 is closed. If the car is running forward above a predetermined speed, this brings about the condition shown in Fig. 5 in which the stator mid-position control port 250 is supplied with oil at rear pump pressure, and this holds the stator blades 62 in position of lowest angle as previously described. Whenever the torque demand rises above a value indicated by a gage reading of 6 to 8 inches of mercury vacuum in the engine manifold, the pressure of oil in chamber 316 of the vacuum modulator valve 320, acting in chamber 370 of the valve 364 pushes the valve stem 366 to the right to cut off conduit 360 and connect line 252 to exhaust port 362. This establishes the condition shown in Fig. 4 in which port 250 is vented but the low-angle holding chamber 208b is supplied with oil from conduit 246 and regulated by valve 248 and the corner 258 of the piston so that the pressure of oil in the converter holds the stator piston 244 in the mid-position shown in Fig. 4 as previously described. The land 374 of valve 364 is of larger diameter than the land 376 so that when oil is admitted to the line 252 from the line 360 the excess of area in land 374 adds to the force of the spring 368 to provide hysteresis to cause valve 364 to open and close at different values of torque demand, and thus prevent hunting, as is known.

Whenever the manual valve 340 is in neutral position, designated N, the open end 348 of the shift valve is closed by land 380, to supply the release chamber 120 of neutral clutch 11 with oil from main line port 342 to hold the neutral clutch disengaged. In all other positions of the manual valve the land 380 is at the right of the connection to chamber 120 to vent it through the open end 348, to permit converter pressure to engage the neutral clutch 11.

In the forward drive or D position, the land 380 is between the connections to neutral clutch release chamber 120 and forward drive clutch servo 56 so that the forward drive clutch 54 (Fig. 1) is engaged. Whenever the manual valve is placed in reverse or R position the land 382 moves to the right of the connection to the reverse clutch servo 30 and land 380 taken the position between the mainline port 342 and the connection to the forward drive clutch servo 56. This vents the forward drive clutch servo 56 through the open end 348 and supplies oil to the reverse clutch servo 56 and leaves the neutral clutch release servo vented.

The control system operates as follows. Assume the car is standing still with the engine running and the throttle closed or in the idling position. If the manual valve is in neutral position, the neutral clutch release servo 120 is supplied with oil and consequently disengages the neutral clutch 11. Also the forward drive clutch servo 56 is energized setting the forward drive clutch 54. This arrangement assures that when the control is later put into forward drive or reverse position, the forward drive clutch will always be set before the neutral clutch is engaged. Likewise the stator control valve 344 admits oil to the cylinder 208 through the line 246. On starting, and in reverse the torque demand may be considered to be high, regardless of engine manifold pressure. Although on starting forward or in any conditions of reverse at low throttle the low to medium performance control valve 364 is in position to supply port 250, which would otherwise hold the stator in low position, now there is no pressure in line 252 because the rear pump is not delivering oil. Consequently, this places the stator in mid position, which it always takes on starting and in reverse. This also restricts flow through the converter at engine idling speeds, which tends to prevent creep.

Let us assume that the car is to be started forward by placing the manual control in D position. The neutral clutch release chamber 120 is now vented and the neutral clutch is applied by converter pressure, thus conditioning the car for drive. Thereafter opening of the throttle starts the car in the usual manner with the stator in the mid-range position to give medium performance which is of advantage on starting. The stator will remain in mid-position until the car reaches a predetermined speed, at which time the pressure of the rear pump will be supplied to port 250 through the open low to mid-range stator control valve 364 if the throttle is not advanced. This will move the stator piston to the position of lowest angle shown in Fig. 5.

If the car is started with the throttle at advanced opening indicating a medium or high torque demand or if at any time after starting the throttle is opened far enough to cause the pressure in chamber 316 of the vacuum modulator valve 314 to close the mid-range stator control valve 364 then the line 252 will be vented and the stator will remain in mid-position until the torque demand falls enough to reduce the pressure in chamber 316 of the vacuum modulator valve sufficiently to allow mid-range stator control valve 364 to close.

In reverse drive the stator will continue in mid-position regardless of speed or torque demand because the rear pump, running backwards, produces no pressure, and the line 252 cannot be filled.

In either of the drive positions, D or R, whenever the throttle is moved past wide-open throttle position by the arm 354 operated by the usual throttle pedal, indicating very high torque demand, then the valve 364 is closed by high pressure in chamber 370, venting port 250 and the low-angle holding chamber 208b is vented through line 246 and the stator moves to the highest angle position as shown in Fig. 3.

Assuming that the car is started gently, that is at low throttle opening: After the car reaches some definite speed, the rear pump pressure in line 360 will move the stator blades 62 from medium angle to low angle. As is known, when car speed attains a predetermined relationship to engine speed, the condition known as hydrodynamic coupling occurs in which oil leaves $T_3$ in such a direction as to strike the back or convex sides of the blades 62 and so rotates the whole reaction device forward. If thereafter the blades are placed in medium angle with the car at low and medium speeds, the stator again becomes stationary and the converter goes from coupling stage back to converter stage. Converter stage continues until the car speed increases to the point where coupling can occur with the blades at medium angle. It is even possible to design the transmission so that coupling does not occur within car speed practically attainable, when the blades are at medium angle. However if coupling occurs at medium angle, and if thereafter the throttle pedal is floored, the blades are placed in high angle and the stator again locks against backward rotation and the device again reverts to the converter stage.

I claim:

1. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a first passage to the chamber, means for supplying to the first passage fluid under pressure to overcome the urging means and to move the adjusting element to a second position providing a different torque tarnsmitting condition, a second passage to the chamber, means responsive to the position of the adjusting member for controlling flow through the second passage, a vent connected to the second passage, and means for closing the vent and supplying to the second passage fluid under pressure to overcome the urging means and move the adjusting member to a third position providing a third torque transmitting condition.

2. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a first passage to the chamber, means for supplying to the passage fluid under pressure to overcome the urging means and to move the adjusting element to a second position providing a different torque transmitting condition, a second passage to the chamber, means responsive to the position of the adjusting member for controlling flow through the second passage, a vent connected to the second passage, and means responsive to forward rotation of the output member for closing the vent and supplying to the second passage fluid under pressure to overcome the urging means and move the adjusting member to a third position providing a third torque transmitting condition.

3. In a hydrodynamic device for transmitting torgue from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a first passage to the chamber, means for supplying to the passage fluid under pressure to overcome the urging means and to move the adjusting element to a second position providing a different torque transmitting condition, a second passage to the chamber, means responsive to the position of the adjusting member for controlling flow through the second passage, a vent connected to the second passage, and means responsive to forward rotation of the output member above a predetermined speed for closing the vent and supplying to the second passage fluid under pressure to overcome the urging means and move the adjusting member to a third position providing a third torque transmitting condition.

4. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a first passage to the chamber, means for supplying to the passage fluid under pressure to overcome the urging means and to move the adjusting element to a second position providing a different torque transmitting condition, a second passage to the chamber, means responsive to the position of the adjusting member for controlling flow through the second passage, a vent connected to the second passage, and means responsive jointly to forward rotation of the output member and to low torque demand on the input member for closing the vent and supplying to the second passage fluid under pressure sufficient to overcome the urging means and move the adjusting member to a third position providing a third torque transmitting condition.

5. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a passage to the chamber, means for supplying to the passage fluid under pressure to overcome the urging means and to move the adjusting element to a second position providing a different torque transmitting condition, a port in the chamber, means responsive to the position of the adjusting member for opening and closing the port, a conduit connected to the port, and means for selectively venting the conduit and supplying to the conduit fluid under pressure to overcome the urging means.

6. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a passage to the chamber, means for supplying to the passage fluid under pressure to overcome the urging means and to move the adjusting element to a second position providing a different torque transmitting condition, a port in the chamber, means responsive to the position of the adjusting member for opening and closing the port, a conduit connected to the port, means responsive to high torque demand on the input member for venting the conduit, and means responsive to forward rotation of the output member for supplying fluid under pressure to the conduit.

7. In a hydrodynamic device for transmitting torque from an input member to an output member, in combination, means including a movable adjusting element for varying the torque between the members, the torque transmitting device including means normally urging the adjusting element toward a first position providing one torque transmitting condition, an expansible fluid pressure chamber for opposing the urging means, a passage to the chamber, means for supplying to the passage fluid under pressure to overcome the urging means and to move the adjusting element to a second position providing a different torque transmitting condition, a port in the chamber, means responsive to the position of the adjusting member for opening and closing the port, a conduit connected to the port, means responsive to high torque demand on the input member for venting the conduit, and means responsive to forward rotation of the output member above a predetermined speed for supplying fluid under pressure to the conduit.

8. In a hydrodynamic device for transmitting torque from an input to an output member, in combination, means including a movable adjusting element for varying the torque transmitted between the input and output members, the torque transmitting device including means for urging the adjusting element toward one position providing one torque transmitting condition, an expansible fluid pressure chamber for opposing the urging means, an inlet passage and a second passage for the chamber, means for supplying to the passages fluid under pressure sufficient to overcome the urging means and move the adjusting element to another position providing another torque transmitting condition between the members, means for interrupting the supply to the second passage and venting the second passage to permit the urging means to move the adjusting element toward said one position, and means responsive to the position of the adjusting member for closing the second passage when the adjusting member reaches an intermediate position providing an intermediate torque transmitting condition.

9. A transmission comprising in combination a hydrodynamic device for transmitting torque to an output member from an input member, means including a movable adjusting element for varying the torque transmitted between the input and output members, the torque transmitting device including means for urging the adjusting element toward one position providing one torque transmitting condition, an expansible fluid pressure chamber for opposing the urging means, an inlet passage and a second passage for the chamber, means for supplying to the passages fluid under pressure sufficient to overcome the urging means and move the adjusting element to another position providing another torque transmitting condition between the members, means responsive to the torque demand on the input member for interrupting the supply to the second passage and for venting the second passage to permit the urging means to move the adjusting element toward said one position, and means responsive to the position of the adjusting member for closing the second passage when the adjusting member reaches an intermediate position providing an intermediate torque transmitting condition.

10. In a hydrodynamic device for transmitting torque from an input member to an output member, in combination, means including a movable adjusting element for varying the torque transmitted between the input and output members, the torque transmitting device including means for urging the adjusting element toward a first position providing relatively high torque between the members, an expansible fluid pressure chamber for opposing the urging means, an inlet passage and a second passage for the chamber of the motor, a vent for the second passage, means normally supplying to the inlet passage fluid under pressure sufficient to overcome the urging means and to move the adjusting element toward a second position providing lower torque between the members, means responsive to the position of the adjusting element for opening the second passage when the element moves beyond the second position, and means responsive both to forward rotation of the output member above a predetermined speed and to low demand on the input member for closing the vent and supplying to the second passage fluid under pressure sufficient to move the adjusting element to a third position providing still lower torque between the members.

11. In a hydrodynamic device for transmitting torque from an input member to an output member, in combination, means including a movable adjusting element for varying the torque between the members, a fluid pressure cylinder having a piston movable therein and connected to the adjusting element, the torque transmitting device including means urging the piston toward one end of the cylinder, a first passage connected to the cylinder adjacent said one end, means for either venting said passage or supplying to said passage fluid under pressure to move the piston toward the other end of the cylinder against the urging means, a second passage communicating with the cylinder between its ends and adapted to be covered and uncovered by the piston in its movement, and means for either venting the second passage or supplying to the second passage fluid under pressure to move the piston farther against the urging means.

12. In a hydrodynamic device for transmitting torque from an input member to an output member in combination, a front pump adapted to supply fluid under pressure whenever the input member rotates, a rear pump adapted to supply fluid under pressure whenever the output member rotates, means including a movable adjusting element for varying the torque between the members, a fluid pressure cylinder containing a movable piston connected to the adjusting element, the torque transmitting device including means urging the piston toward one end of the cylinder, a first passage connected to the cylinder adjacent said one end, means for either venting said passage or connecting said passage to the front pump to move the piston toward the other end of the cylinder against the urging means, a second passage communicating with the cylinder between its ends and adapted to be covered and uncovered by the piston in its movement and means for either venting the second passage or connecting the second passage to the rear pump.

References Cited in the file of this patent

FOREIGN PATENTS

| | | |
|---|---|---|
| 444,171 | Great Britain | Mar. 16, 1936 |
| 750,788 | Great Britain | June 20, 1956 |